United States Patent [19]

Aplenc

[11] 4,407,126

[45] Oct. 4, 1983

[54] THERMOSYPHON BOILER FOR A GEOTHERMAL PUMPING SYSTEM

[75] Inventor: Andrej M. R. Aplenc, Jackson, Miss.

[73] Assignee: Sperry Corporation, New York, N.Y.

[21] Appl. No.: 322,498

[22] Filed: Nov. 18, 1981

[51] Int. Cl.³ .............................................. F03G 7/00
[52] U.S. Cl. ................................................. 60/641.4
[58] Field of Search ........................ 60/641.4; 417/379

[56] References Cited

U.S. PATENT DOCUMENTS 3,898,020 8/1975 Matthews ........................... 60/641.4

Primary Examiner—Allen M. Ostrager
Attorney, Agent, or Firm—Howard P. Terry

[57] ABSTRACT

In a geothermal energy conversion system having a boiler, a liquid trap, and a turbine driven pumping unit, a thermosyphon boiler is disposed between the liquid trap and the turbine driven pump. The thermosyphon boiler evaporates the liquid collected in the liquid trap and then superheats the evaporated liquid and steam emitted from the boiler such that the steam directed into the turbine driven pumping unit is of extremely high quality.

4 Claims, 2 Drawing Figures

THERMOSYPHON BOILER FOR A GEOTHERMAL PUMPING SYSTEM

CROSS REFERENCE TO RELATED APPLICATION

The present application is related to co-pending U.S. patent application Ser. No. 274,838, filed June 1981 in the name of Andrej M. R. Aplenc, entitled "Downhole Liquid Trap For A Geothermal Pumping System" and assigned to Sperry Corporation.

BACKGROUND OF THE INVENTION

1. Field of the Invention

This invention relates generally to efficient means for the generation of electrical power or other power utilizing energy from geothermal sources, and more specifically relates to arrangements including efficient steam generation and pumping equipment for application in deep hot wells for transfer of thermal energy to the earth's surface.

2. Description of the Prior Art

A major advance in the art of extraction and use of geothermal energy is described in U.S. Pat. No. 3,824,793, entitled "Geothermal Energy System and Method", by H. B. Matthews, issued July 23, 1974 and assigned to the applicant's assignee. The prior Matthews invention provides means for efficient power generation employing energy derived from subterranean geothermal sources through the generation of substantially dry super-heated steam and the consequent operation of sub-surface equipment for pumping extremely hot well water at high pressure to the earth's surface. Clean water is injected at a first or surface station into the deep well where thermal energy stored in hot solute-bearing deep well water is used in a boiler at a second or deep well station to generate superheated steam from the clean water. The resultant substantially dry super-heated steam is used at the well bottom for operating a turbine driven pump for pumping the hot solute bearing well water to the first station at the earth's surface, the water being pumped at all times and locations in the system at pressures which prevent flash steam formation. The highly energetic water is used at the surface or first station in a binary fluid system so that its thermal energy is transferred to a closed-loop surface-located boiler-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

A turbine pump unit well adapted for use with the above described geothermal energy conversion system is described in U.S. Pat. No. 3,908,380, entitled "Geothermal Energy Turbine and Well System" By J. L. Lobach, issued Sept. 30, 1975 and assigned to the applicant's assignee. The turbine driven pump features a compact and efficient system turbine configuration adapted for use in the hostile environment of the deep hot-water well. Substantially dry super-heated steam from the boiler passes downwardly to impact turbine blades at the periphery of the turbine wheel. A further feature permits the expanding steam then to reverse its sense of flow in a compact arrangement returning the steam along the axis of the turbine wheel and then to the earth's surface for further energy recovery.

The quality of the steam at the turbine inlet of the turbine pump unit, however, may vary depending on the particular geometry of the boiler annulus and on other factors affecting the heat transfer rates. Under certain conditions the boiler may be able to generate wet steam only, causing the turbine efficiency, the total turbine power output, and the turbine service life to decrease from their design values. For example, the presence of liquid droplets in the incoming high velocity steam will cause corrosion in the turbine and will cause the potentially destructive electro-static charge build-up on the rotating assembly due to the polar nature of the water droplets.

An apparatus which helps to alleviate the problems associated with wet steam is described in co-pending U.S. patent application, Ser. No. 274,838, filed June 9, 1981 entitled "Downhole Liquid Trap For A Geothermal Pumping System", by Andrej M. R. Aplenc, and assigned to Sperry Corporation. The above referenced invention is coupled to the turbine driven pumping equipment which is responsive to the superheated steam emitted from the boiler. The liquid droplets entrained in steam are separated from the vapor by either centrifugal, gravitational, or inertial separation means. The droplets are collected in a liquid trap, and the vapor is directed into the inlet of the turbine driven pumping equipment. The liquid collected in the trap may be harmlessly flashed back into the exhaust vapor of the turbine driven pumping equipment, thereby enabling the turbine driven pumping equipment to operate more efficiently and preventing damage to the turbine. There are, however, no provisions within the liquid trap to vaporize the separated out liquid other than by flashing it back into the exhaust vapor. Moreover, even though the separated out steam is of very high quality, it is not completely dry and there are no provisions within the liquid trap to superheat it.

SUMMARY OF THE INVENTION

The apparatus of the present invention provides means for evaporating and superheating the separated liquid emitted from the boiler associated with a turbine driven pumping unit in a geothermal energy conversion system. Specifically, the liquid droplets entrained in the vapor emitted from the boiler are separated and collected in a liquid trap disposed beneath the boiler. The collected liquid is conveyed through a first plurality of tubes which are disposed in a heat transfer relationship with an upwardly flowing geothermal fluid, in order to evaporate the collected liquid. The evaporated liquid is then conveyed through a second plurality of tubes, which are also disposed in a heat transfer relationship to the upwardly flowing geothermal fluid in order to superheat the evaporated liquid and the vaporized steam emitted from the boiler. The two sources of superheated steam are directed into a turbine pumping unit, thereby increasing the efficiency and operating characteristics of the geothermal energy conversion system.

DESCRIPTION OF THE PREFERRED EMBODIMENTS

Figure 1A:
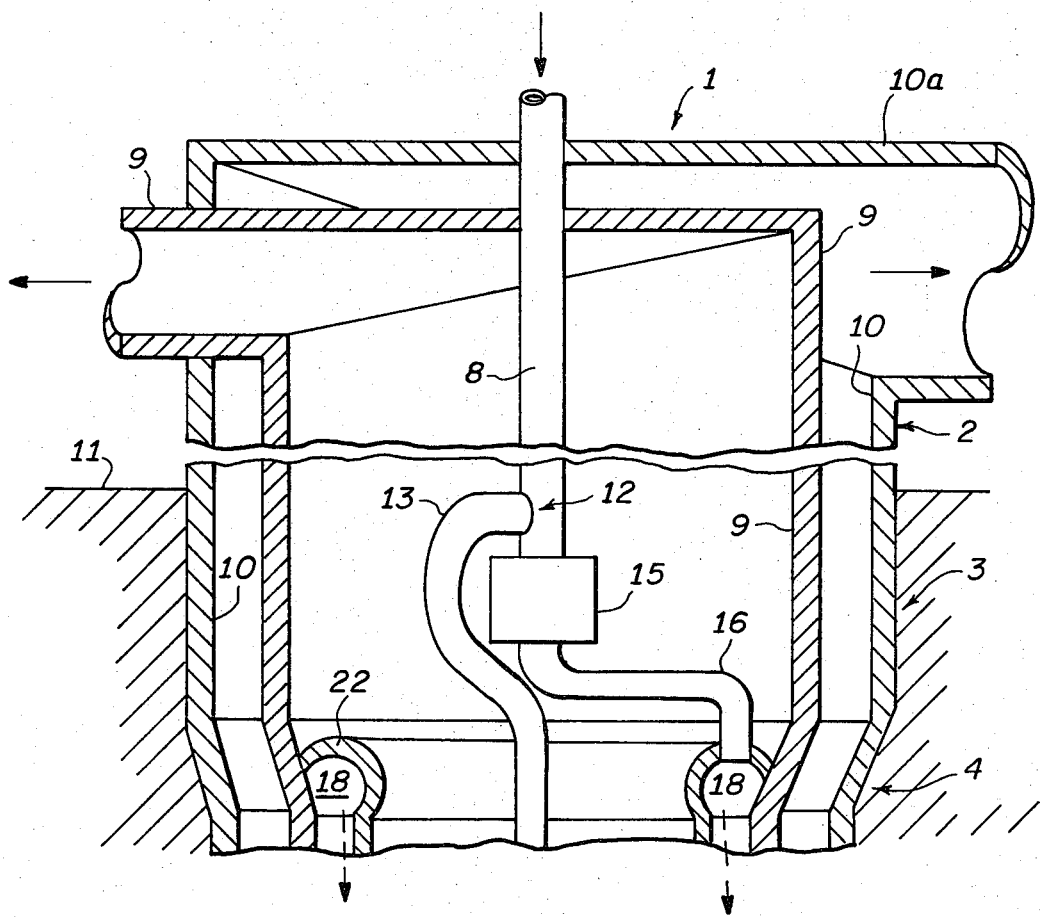
FIGS. 1A and 1B are elevation views mostly in cross-section of the deep well geothermal pumping apparatus utilizing the apparatus of the present invention.
Figure 1B:
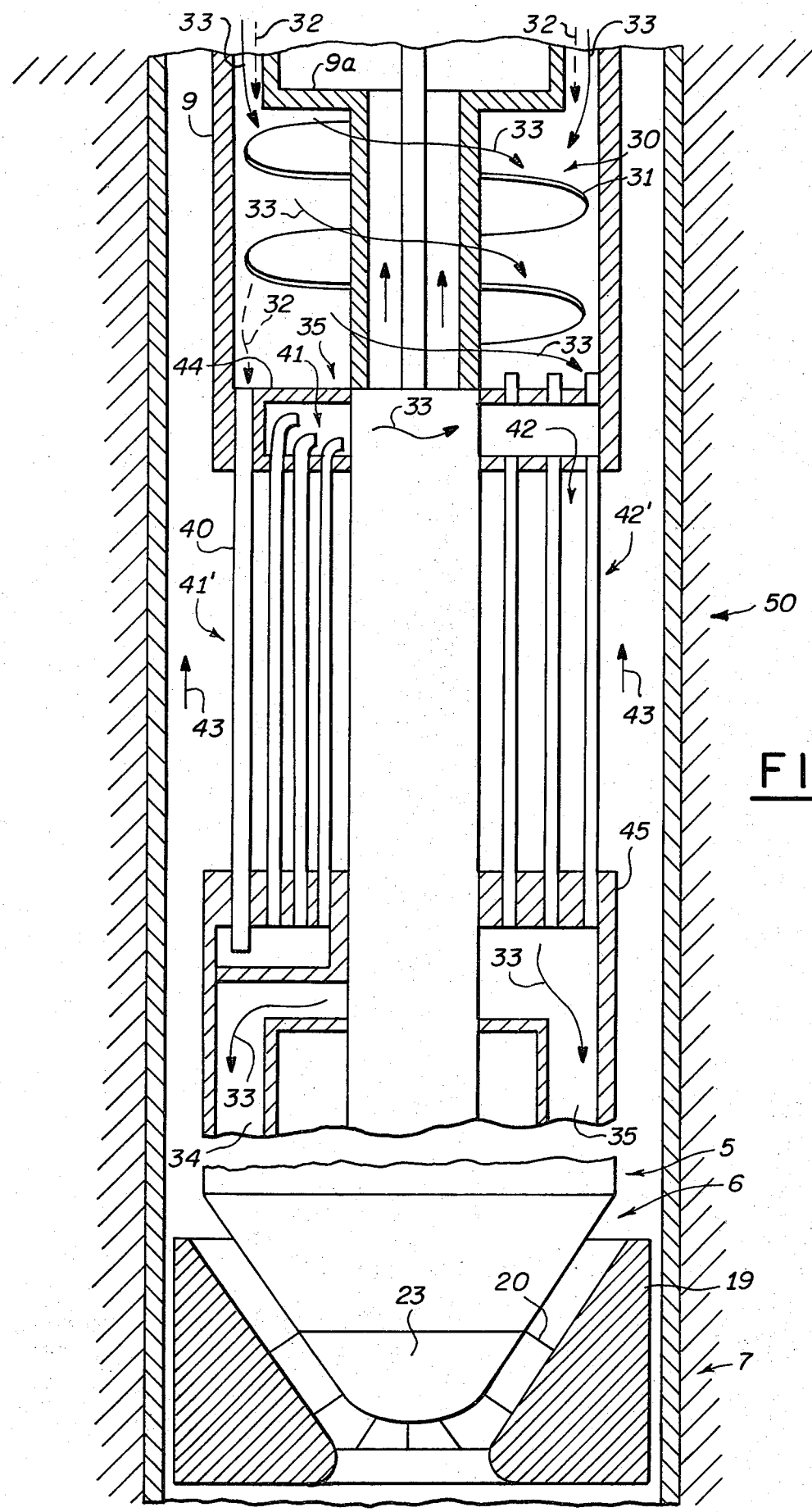

FIGS. 1A and 1B illustrate the general structure and characteristics of that portion of the geothermal energy extracting system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration of FIGS. 1A and 1B is seen to include a well head section 1 located above the earth's surface 11 and a main well section 2 extending downward from the well head section 1 and below the earth's surface 11. At the subterranean source of hot, high pressure water, the main well section 2 joins a boiler or a steam generator input section 3. The boiler or steam generator section 4, the steam turbine section 5, a power plant rotary bearing section 6, and a hot water pumping section 7 follow in close cooperative succession at increasing depths.

Extending downward from the well head section 1 at the earth's surface 11, the well casing pipe 10 surrounds in preferably concentric relation an innermost stainless steel or other high quality alloy steel pipe or conduit 8 for supplying a flow of relatively cool and relatively pure water at the bottom of the well. A second relatively large pipe or conduit 9 of similar quantity and surrounding pipe 8 is also provided within well casing 10, extending from the well head 1 to the energy conversion and pumping system at the bottom of the well and permitting turbine exhaust steam to flow to the surface of the earth.

It will be seen from FIG. 1 that relatively clean and cold water is pumped down the inner pipe 8 from the surface 11 station to the region of the pipe tee 12. At tee 12, the downward flowing water is divided between two branch paths. A first branch path feeds clean lubricating water through pipes 13 and 16 for lubricating a system of bearings within the system bearing section 6. The second branch path feeds clean water through pressure regulator system 15 and via distribution pipe or pipes 16 to the input manifold 22 of a boiler 18 formed between the generally concentric walls of alloy pipes 9 and 9a. Accordingly, a high pressure super-heated system is generated in the boiler or steam generator 18.

It should be noted that the quality of steam emitted from the boiler 18 may vary depending upon the particular geometry of the boiler annulus and on other factors affecting the heat transfer rates. Under certain circumstances the boiler 18 may be able to generate wet steam only, causing the turbine efficiency, the total turbine power output, and the turbine service life to decrease from their design values. This wet steam is comprised of vapor and liquid droplets entrained therein. Preferably the vapor and liquid droplets are separated by centrifugal separation means 30 having helical swirler vanes 31 disposed about the pipe 9a. As the wet steam descends from the boiler 18 and enters the separation means 30, it is forced into circular motion by the appropriately shaped vanes 31. The centrifugal acceleration thus induced, forces the water droplets towards the perimeter of the pipe 9 where they coalesce and form a film on the wall. The film is collected in a liquid trap 36 as described in copending U.S. patent application Ser. No. 274,838. The flow of the water droplets is represented by the dotted arrows 32, whereas the flow of the vapor is represented by the arrows 33.

The water droplets 32 are directed into a thermosyphonboiler 50 which includes a first plurality of tubes having a downcomer tube 40 and a plurality of evaporator tubes 41 which are useful for evaporating the water droplets 32. The evaporated water droplets and the flow of vapor 33 are directed into a second plurality of tubes 42 which are useful for superheating both the downward flowing vapor 33 and the evaporated water droplets. It should be noted that the tubes 41, 42 are both disposed in a heat transfer relationship to an upwardly flowing hot geothermal brine represented by arrows 43. The top portion of the tubes 41, 42 are held in place by a first perforated annular collar 44 which forms a portion of the liquid trap 36. The bottom portion of the tubes 41, 42 are held in place by a second perforated annular collar 45. The superheated vapor 33 emitted from the tubes 42 is directed into the turbine section 5 via conduits 34, 35.

The function of the turbine located at 5 and supported on bearings located within bearing section 6 is to drive a hot water pump located at section 7. Hot, high pressure water is thus impelled upward by the rotating pump vanes 20 between the rotating conical end 23 of the pump and an associated rotating or stationary shroud 19; the hot water 43 is pumped upward at high velocity in the annular conduit between pipes 9 and 10, thus permitting use of the thermal energy it contains at the earth's surface. More important, the hot water is pumped upward to the earth's surface 11 at a pressure preventing it from flashing into and thus undesirably depositing dissolved salts at the point of flashing.

Accordingly, it is seen that the extremely hot, high-pressure well water 43 is pumped upward, flowing in the annular region defined by alloy pipes 9 and 10. Heat supplied by the hot water 43 readily converts the clean water flowing into manifold 22 of the steam generator 18 into highly energetic steam. The clean water, before flowing through tee junction 12 and pressure regulator 15, is at a very high pressure due to its hydrostatic head and usually also to pressure added by a surface pump, so that it may not flash into steam. The pressure regulator system 15 controls the pressure of the clean water flowing therethrough so that it may be vaporized in the boiler or the steam generator 18. The highly energetic steam drives the steam turbine and is redirected to flow upward to the surface 11 after expansion as relatively cool steam flowing within the annular conduit defined between alloy pipes 8 and 9. Thermal energy is recovered at the earth's surface 11 primarily from the hot, high pressure water, but may also be recovered from the turbine exhaust steam.

The operation of the above described geothermal energy conversion system is greatly enhanced by the apparatus of the present invention. The efficient operation of the thermosyphon boiler-superheater 50 is due to the fact that the heat transfer rates to boiling water are much higher than the heat transfer rates to very high quality steam. Thus, while a conventional tube bundle can increase the quality of steam coming out of the annular boiler 18, the liquid trap 36 and the thermosyphon boiler-superheater 50 combination could do it more efficiently.

The operation of the thermosyphon boiler-superheater 50 may be explained by reference to FIGS. 1A and 1B which illustrate the annular boiler 18, the liquid trap 36 and the thermosyphon boiler-superheater 50.

Wet steam from the annular boiler 18 enters the liquid trap 36 where the liquid 32 is separated from steam vapor 33. The steam vapor 33 enters the superheater section 42' of the thermosyphon boiler-superheater 50 where it is superheated to a substantial degree due to the heat received from the hot brine 43 encircling the superheater tubes 42. The separated out liquid flows to the boiler section 41' of the thermosyphon boiler-superheater 50 where the heat supplied from the brine 43 converts it to vapor. Within the boiler section 41' the direction of the liquid flow is reversed so that when it is converted to steam it joins the steam coming from the liquid trap 36, and then enters the superheater 42' section described above.

It should be noted that the boiler section 41' is shown to consist of a downcomer tube 40 into which the liquid 32 enters and of evaporator tubes 41 where the evaporation takes place. The design of the downcomer tube 40 is such that no evaporation of the liquid is taking place there. Thus, by virtue of having a sufficient part of the downcomer tube 40 filled with liquid, the necessary hydrostatic pressure is provided to overcome the resistance to the flow in evaporator tubes 41. There the liquid flows up and because of the intensive heat transfer from the brine 43, it is converted to steam 33. This design feature of having a downcomer tube 40 providing the hydrostatic pressure to induce the flow in the evaporator tubes 41 is referred to herein as the thermosyphon. Its action assures the proper operation of the whole design since the pressures of liquid, of the steam exiting the evaporator tubes 41 and of the steam entering the superheater tubes 42 are by necessity equal. As the steam 33 exits the evaporator tubes 41, it joins the steam 33 coming from the liquid trap 36 and both steams jointly enter the superheater tubes 42. There any residual moisture is evaporated, and in addition, the steam 33 is superheated to a substantial extent.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An improved geothermal pumping system of the type having a boiler for vaporizing a working fluid with thermal energy from geothermal brine and a turbine driven pumping unit which is disposed in the geothermal brine and which is driven by the vaporized working fluid, wherein the improvement comprises:
   means for separating liquid droplets from the vaporized working fluid emitted from said boiler;
   means for collecting said liquid droplets;
   a first plurality of tubes, operatively coupled to said liquid collecting means and disposed in a heat transfer relationship to an upwardly flowing geothermal fluid, for evaporating the collected liquid; and
   a second plurality of tubes, responsive to the vaporized working fluid emitted from said boiler and to the output of said first plurality of tubes and disposed in a heat transfer relationship to the upwardly flowing geothermal brine, for superheating the evaporated liquid emitted from said first plurality of tubes and the vaporized working fluid emitted from said boiler.

2. An apparatus according to claim 1 wherein said first plurality of tubes includes a downcomer tube and a plurality of evaporator tubes such that the downcomer tube provides hydrostatic pressure to overcome the flow resistance in said evaporator tubes.

3. An apparatus according to claim 2 wherein said first plurality of tubes and said second plurality of tubes are disposed at substantially the same level within a geothermal well with said boiler and said separating means being disposed above said tubes and said turbine driven pumping unit being disposed below said tubes.

4. An apparatus according to claim 3 which further includes a first annular collar which is disposed at the top of said first plurality of tubes and second plurality of tubes, and a second annular collar which is disposed at the bottom of said first plurality of tubes and second plurality of tubes, for retaining said tubes.

* * * * *